United States Patent [19]

Yasuda

[11] Patent Number: 4,747,033

[45] Date of Patent: May 24, 1988

[54] ILLUMINATING DEVICE

[75] Inventor: Yuji Yasuda, Kanagawa, Japan

[73] Assignee: Ricoh Company, Ltd., Tokyo, Japan

[21] Appl. No.: 787,110

[22] Filed: Oct. 15, 1985

[30] Foreign Application Priority Data

Oct. 12, 1984 [JP] Japan ............................... 59-213975
Oct. 25, 1984 [JP] Japan ............................... 59-224983

[51] Int. Cl.⁴ .............................................. F21V 7/04
[52] U.S. Cl. .................................... 362/296; 362/216; 362/297; 350/630; 355/67
[58] Field of Search .................... 350/630; 355/67; 362/296, 297, 216, 346

[56] References Cited

U.S. PATENT DOCUMENTS 3,852,584 12/1974 Levin ................................ 362/216
4,241,392 12/1980 Boone ............................... 362/342
4,249,234 2/1981 Park et al. ........................ 362/228
4,510,560 4/1985 Negishi ............................ 362/299

Primary Examiner—Samuel Scott
Assistant Examiner—Allen J. Flanigan
Attorney, Agent, or Firm—Oblon, Fisher, Spivak, McClelland & Maier

[57] ABSTRACT

An illuminating device for uniformly illuminating a planar object has a single light source and a reflecting mirror. The planar object is illuminated by light reflected from the reflecting mirror. The reflecting mirror has a reflecting surface shaped to cause the reflected light to uniformly illuminate the planar object dependent on whether the planar object is illuminated directly or through a transparent plane-parallel plate such as a glass plate, or dependent on the type of the light source.

7 Claims, 7 Drawing Sheets

ILLUMINATING DEVICE

BACKGROUND OF THE INVENTION

The present invention relates to an illuminating device, and more particularly to an illuminating device for uniformly illuminating a planar object.

Paintings, for example, are required to be uniformly illuminated when they are displayed.

For uniformly exposing a planar photosensitive surface in a full-exposure electrophotographic or electrostatic copying machine, the surface of an original document to be copied is illuminated at a special distribution of light intensities in view of the cosine law of a focusing lens. If the entire surface of the original document can be uniformly illuminated, it is far easier and more accurate to correct exposure light rays for achieving a uniform exposure condition than to accomplish the special light intensity distribution.

Therefore, uniform illumination of a planar object is of great technical merit in various fields.

One known method of uniformly illuminating a planar object in relation to an electrophotographic copying machine is disclosed in U.S. Pat. No. 4,298,275. According to the disclosed method, light emitted from a light source is diffused in order to illuminate the object. However, the method as it is used to illuminate an original document in a copying machine is problematic in that it produces a large amount of flaring. Another problem with this method is that much difficulty would be experienced in applying the method to other fields than the electrophotographic copying machine.

SUMMARY OF THE INVENTION

In view of the aforesaid drawbacks of the conventional illuminating system, it is an object of the present invention to provide an illuminating device which can illuminate a planar object uniformly with a single light source and can be used in illuminating various objects.

An illuminating device of the present invention for uniformly illuminating a planar object has a single light source and a reflecting mirror. The planar object is illuminated by light reflected from the reflecting mirror. The reflecting mirror has a reflecting surface shaped to cause the reflected light to uniformly illuminate the planar object dependent on whether the planar object is illuminated directly or through a transparent planeparallel plate such as a glass plate, or dependent on the type of the light source, which may be a point light source, an arcuate light source, or a straight light source.

The present invention has the following four embodiments:

First embodiment

The light source is a point light source or an arcuate light source, and the object is directly illuminated by light reflected from the reflecting mirror.

Second embodiment

The light source is a point light source or an arcuate light source, and the object is illuminated by light reflected from the reflecting mirror and transmitted through a transparent plane-parallel plate.

Third embodiment

The light source is a straight light source, and the object is directly illuminated by light reflected from the reflecting mirror.

Fourth embodiment

The light source is a straight light source, and the object is illuminated by light reflected from the reflecting mirror and transmitted through a transparent plane-parallel plate.

According to the first embodiment, the reflecting mirror has a reflecting surface defined as a curved surface of revolution, produced by revolving a certain curve around an axis. The axis extends perpendicularly to a plane to be illuminated and is disposed outside of an illuminated zone. The reflecting surface is shaped to reflect light from the light source toward the plane to be illuminated at a liminous flux density proportional to the distance from the axis.

The light source comprises a point light source positioned on the above axis or an arcuate light source having a central axis aligned with the above axis. Where the arcuate light source is used, its central axis which extends through the center of curvature of the arcuate light source and perpendicularly to the plane of the arcuate light source is aligned with the axis of revolution of the reflecting surface.

According to the second embodiment, the object is illuminated through the plane-parallel plate. Light rays passing through the plane-parallel plate have different transmittivities if they fall thereon at different incident angles. The curved reflecting surface of the reflecting mirror is shaped in view of the transmittivities of the plane-parallel plate, i.e., shaped by correcting the shape of the reflecting surface of the first embodiment in view of the transmittivities of the plane-parallel plate.

According to the third embodiment, the light source has a straight uniform light-emitting portion capable of uniformly emitting light from the entire region thereof. The light-emitting portion has a length equal to or larger than the width of an effective illuminated zone, and the reflecting mirror has a length equal to or larger than the width of the effective illuminated zone. The reflecting mirror has a reflecting surface shaped in a plane normal to the light-emitting portion to reflect light rays emitted at equal angles from the light-emitting portion within the plane to fall on the effective illuminated zone at equal intervals thereon.

According to the fourth embodiment, the lengths of the light-emitting portion of the light source and the reflecting mirror are equal to or larger than the width of the effective illuminated zone. The transversely cross-sectional shape of the reflecting surface of the reflecting mirror remains the same in the longitudinal direction of the reflecting mirror. The transversely cross-sectional shape of the reflecting surface of the reflecting mirror is shaped in a plane normal to the light-emitting portion of the light source to cause the reflected light to uniformly illuminate the planar object through the plane-parallel plate. The transmittivity of the plane-parallel plate varies dependent on the angle of incidence to the plane-parallel plate. The transversely cross-sectional shape of the reflecting surface is shaped to reflect light rays emitted at equal angles from the light-emitting portion within the plane toward the effective illuminated zone at intervals selected to correct the differences between transmittivities of the transparent plane-parallel plate due to different angles of incidence thereto.

In any of the first through fourth embodiments, the planar object can be uniformly illuminated.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
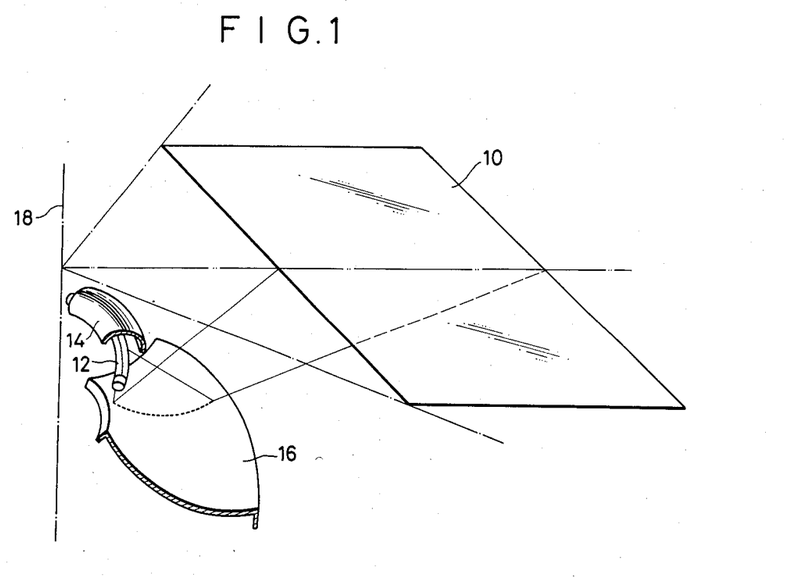
FIG. 1 is a perspective view, partly broken away, of an illuminating device according to an embodiment of the present invention.

FIG. 1 shows an illuminating device according to an embodiment of the present invention. Designated by the reference numeral 10 is a plane to be uniformly illuminated by the illuminating device. An object is positioned with its surface to be illuminated lying in the plane 10. the plane 10 also indicates a zone or area to be illuminated.

The illuminating device has a lamp 12, a light-shielding member 14, and a reflecting mirror 16.

The lamp 12 and the light-shielding member 14 jointly constitute a light source. The lamp 12 comprises a xenon lamp having an arcuate light-emitting portion. The light-shielding member 14 is disposed to prevent light emitted by the lamp 12 from directly reaching the plane 10.

The reflecting mirror 16 has a reflecting surface shaped as a curved surface of revolution with its axis aligned with the central axis of the lamp 12. The central axis of the lamp 12 is denoted at 18 in FIG. 1 and extends perpendicularly to the plane including the arcuate light-emitting portion of the lamp 12. The central axis 18 also extends as a straight line through the center of curvature of the light-emitting portion of the lamp 12.

The axis 18 is normal to the plane 10, but lies outside of the plane 10.

Figure 2:
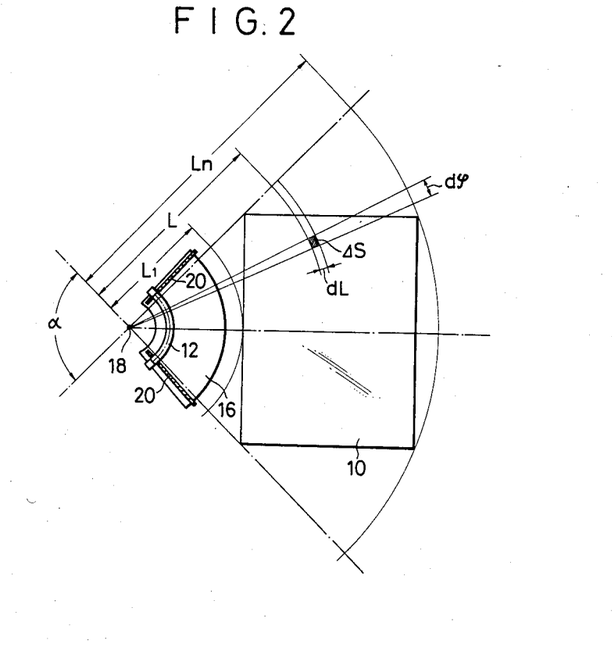
FIGS. 2 and 3 are views explanatory of the shape of the reflecting surface of a reflecting mirror in the illuminating device shown in FIG. 1.

FIG. 2 shows the illuminating device in the direction of the axis 18. Denoted at L1 is the minimum distance of the illuminated zone of the plane 10 from the axis 18, and Ln is the maximum distance of the illuminated zone of the plane 10 from the axis 18. The minimum distance L1 can be selected to be small by positioning the axis 18 outside of the illuminated zone.

Now, a small area $\Delta S$ in the plane 10 will be considered. The small area $\Delta S$ subtends an angle $d\phi$ at the axis 18, and has a width dL in the radial direction. If the distance of the small area $\Delta S$ from the axis 18 is given as L, then the small area $\Delta S$ can be defined as $Ld\phi dL$. Therefore, the small area $\Delta S$ to be illuminated by light emitted from the light-emitting portion of the lamp 12 is proportional to the distance L.

As a consequence, uniform illumination of the plane 10 requires that the light falling on the plane 10, or the density of luminous flux of the light from the reflecting mirror 16, be proportional to the distance L on the plane 10. The reflecting surface of the reflecting mirror 16 should therefore be shaped to meet the above requirement.

The above requirement can strictly be met when the light source is a point light source and the reflecting mirror 16 is a complete curved surface of revolution. For this reason, at least the radius of the arcuate light source must be sufficiently small as compared with the distance L1 and the angle subtended by the lamp 12 and the reflecting mirror 16 at the axis 18 must be larger than the angle subtended by the plane 10 at the axis 18. A pair of side reflecting members 20 is disposed on opposite sides of the reflecting mirror 16 as auxiliary reflecting members, the side reflecting members 20 being normal to the plane 10.

Figure 3:
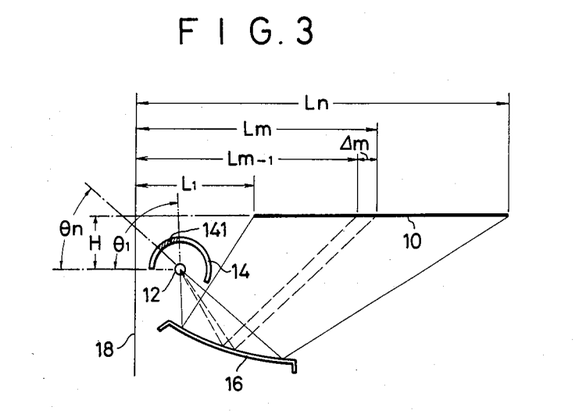

As illustrated in FIG. 3, the arrangement of FIG. 1 is shown in cross section taken along a plane containing the axis 18. The shape of the refelecting surface of the reflecting mirror 16 will be described with reference to FIG. 3.

The angle subtended at the light-emitting portion of the lamp 12 by the illuminated zone (between the ends spaced from the axis 18 by the distances L1, Ln, respectively) through the reflecting mirror 16 is given as $\theta 1 - \theta n$ It is assumed that n light rays are radiated at spacings of equal angles from the lamp 12 onto the zone subtending the angle $\theta 1 - \theta n$, and the angles of these n light rays are expressed by $\theta 1, \theta 2, \ldots, \theta i, \theta i+1, \ldots, \theta n-1, \theta n$. Since the light rays are spaced at equal angles, $\theta i + 1 - \theta i = $ constant.

It is also assumed that the mth and (m−1)th light rays reach the plane 10 at positions which are spaced from the axis by the distances $Lm-1$, $Lm$, respectively, and the difference between the distances $Lm-1$, $Lm$ is expressed as $\Delta m$, as shown in FIG. 3.

As described above, uniform illumination of the plane 10 requires that the luminous flux density be proportional to the distance L. Since the luminous flux density at a position of $(Lm+Lm-1)/2$ between the positions $Lm-1$, $Lm$ is $1/\Delta m$, the above requirement can be expressed by:

$$\frac{1}{\Delta m} = k \frac{(Lm + Lm - 1)}{2} \tag{1}$$

where k is a proportionality constant. As the above relationship has to be effective for m=2, through n, $$\frac{1}{\Delta 2} = k \frac{(L2 + L1)}{2} \tag{2}$$

for m=2.

By dividing the equation (2) by the equation (1), we get:

$$\frac{\Delta m}{\Delta 2} = \frac{L2 + L1}{Lm + Lm + 1} \tag{3}$$

Since $\Delta m = Lm - Lm - 1$ and $\Delta 2 = L2 - L1$, the equation (3) can be written as:

$$\frac{Lm - Lm - 1}{L2 - L1} = \frac{L2 + L1}{Lm + Lm + 1}$$

From this equation, we get:

$$(L2^2 - L1^2) = (Lm^2 - Lm - 1^2) \ (n > m > 2) \tag{4}$$

The equation (4) is computed for m=2 through n, and both sides are added as follows:

$$\sum_{2}^{n}(L2^2 - L1^2) = \sum_{2}^{n}(Lm^2 - Lm - 1^2) \tag{5}$$

From this equation, we get:

$$Ln^2 = (n-1)L2^2 - (n-2)L1^2 \tag{6}$$

By solving the equation (6) for $L2^2$, $$L2^2 = \frac{1}{n-1} Ln^2 + \frac{(n-2)}{n-1} L1^2 \tag{7}$$

By changing the upper limit n with m in the equation (5), $$Lm^2 = (m-1)L2^2 - (n-2)L1^2 \tag{8}$$

By eliminating L2 from the equation (8) using the equation (7), we obtain:

$$Lm^2 = \frac{m-1}{n-1} Ln^2 + \frac{n-m}{n-1} L1^2 \tag{9}$$

Therefore, $$Lm = \sqrt{\frac{m-1}{n-1} Ln^2 + \frac{n-m}{n-1} L1^2} \tag{10}$$

The equation (10) is effective for m=2 through n. For uniform illumination, therefore, the shape of the reflecting surface of the reflecting mirror should be determined so that the equation (10) can be established.

Because of the radius of the arcuate light source, the equation (10) is subject to error in that the illuminance tends to increase at a far point. Accordingly, it is necessary to correct the luminous flux density dependent on the radius of the arcuate light source. The distance Lm for such correction can easily be obtained, as with equations (14) through (21) described later, by replacing a transmittivity correction coefficient with a correction coefficient for the arcuate light source.

Assuming that the position on the reflecting mirror 16 where the mth light ray is reflected thereby is expressed by polar coordiates ($\gamma m$, 74 m) with the center of the coordinate system being at the light-emitting portion of the lamp 12, the inclination $am$ of the reflecting surface at that position meets:

$$am = \frac{\sin \theta m + \frac{H - \gamma m \sin \theta m}{P}}{\cos \theta m + \frac{L'm - \gamma m \cos \theta m}{P}} \tag{11}$$

where $L'm = Lm - d$ and d is the radius of curvature of the lamp 12. P in the equation (11) is given by:

$$P = \sqrt{(H - \gamma m \sin \theta m)^2 + (L'm - \gamma m \sin \theta m)^2}, \text{ and H}$$

in this equation indicates the minimum distance between the light-emitting portion of the light source and the plane 10 as shown in FIG. 3. Therefore, P is the distance between the reflecting point on the reflecting mirror and the illuminated point on the plane (which is illuminated by the mth light ray).

Where the reflecting surface is a continuous surface, the inclination of a tangent line at the reflecting poinit should be expressed by the equation (11). If the reflecting surface is continuous, the position ($\gamma$, $\theta$) (the origin is at the light-emitting portion) on the reflecting surface satisfies the following differential equation:

$$\left(\frac{d\gamma}{d\theta}\right)^2 + 2\gamma \frac{L\cos\theta + H\sin\theta -}{L\sin\theta - H\cos\theta} \left(\frac{d\gamma}{d\theta}\right) - \gamma^2 = 0 \tag{12}$$

Where $L = L(\theta)$ is a continuous function of $\theta$ obtained by putting $n \to \infty$ in the equation (10).

Therefore, for designing the shape of the reflecting surface of the reflecting mirror 16, i.e., the reference shape as a curved surface of revolution, the differential equation (12) should be solved, or if the reflecting surface is to be designed with n being finite, then it would be designed in order to meet the equation (10) or (11). Where the equations (10), (11) are employed, should be varied and successively determined so that the reflecting surfaces at reflecting points for any adjacent light rays, or the tangent lines of such reflecting surfaces will intersect between the light rays.

Since the conditions about the shape of the reflecting surface are given, the above design can be effected by a computer.

As shown in FIG. 3, the light-shielding member 14 is positioned to prevent light of the lamp 12 from directly reaching the object to be illuminated. The illumination efficiency can be increased by constructing the portion 141 of the light-shielding member 14 which corresponds to the effective luminous flux produced by the reflecting mirror 16 as an auxiliary reflecting surface for reflecting the light back to the light-emitting portion. At this time, the light-shielding member 14 serves as an auxiliary reflecting surface.

The distance traversed by the effective light rays from the light source to the reflecting surface of the reflecting mirror 16 may be ten times or more variations of the light-emitting diameter and position of the light source, so that the requirement for the accuracy of the reflecting surface can be lowered and any variation in the illuminance due to light-emitting fluctuations can be reduced.

Another embodiment of the invention will hereinafter be described. In a copying machine, the planar object or original document to be copied is illuminated with light through an original support of glass. The transparent original support or plate having parallel surfaces has its transmittivity variable dependent on the angle of incidence of light falling thereon. Consequently, the shape of the reflecting surface of the reflecting mirror should be determined in view of the varying transmittivity in order to illuminate the object uniformly.

Figure 4:
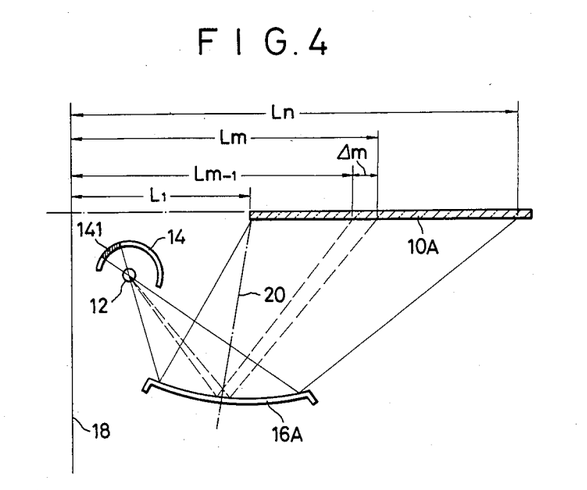
FIG. 4 is a schematic view of an illuminating device according to another embodiment of the invention.

FIG. 4 shows an illuminating device according to such another embodiment. Designated at 10A is a transparent plane-parallel plate having paralle surfaces, and at 16A is a reflecting mirror.

The transmittivity T of light falling on the transparent plane-parallel plate 10A at an incident angle i is given by:

$$T = \alpha Ts^2 + \beta Tp^2 \tag{13}$$

where Ts, Tp are the transmittivities of polarized light components, and $\alpha$, $\beta$ are the ratios of the polarized light components ($\alpha + \beta = 1$).

$$Ts = \sin 2 \, i1 \cdot \sin 2 i2 / \sin^2(i+i2)$$

$$Tp = \sin 2 \, i1 \cdot \sin 2 i2 / \sin^2(i1+i2) \cos^2(i1-i2)$$
$$\sin i1 = n \sin i2$$
n: refractive index, i2: angle of refraction Now, n light rays emitted from the lamp 12 effectively to the illuminated zone will be considered as with the preceding embodiment.

It is assumed that the light ray falls on the plane-parallel plate 10A at a position spaced the distance L1 from the axis 18 at an incident angle $p1$, the light ray falls on the plane-parallel plate 10A at a position spaced the distance Ln from the axis 18 at an incident angle $pn$, the transmittivity of the former light ray is T1, and the transmittivity of the latter light ray is Tn, with the incident angle varying uniformly. With (Tn/T1) being assumed as the product of the distance between the positions illuminated by the above light rays and a certain ratio, the position Lm illuminated by the mth light ray is determined as follows:

Using the correction coefficient e, $$e = \left(\frac{Tn}{T1}\right)^{1/(n-1)} \tag{14}$$

the equation (3) is corrected as follows:

$$\frac{\Delta m}{\Delta 2} = \frac{\Delta 2 + \Delta 3}{\Delta m + \Delta m - 1} \times e^{m-1} \tag{15}$$

From this, $$e^{m-2}(L2^2 - L1^2) = Lm^2 - Lm - 1^2 \tag{6}$$

m in the equation (16) is varied from 1 to (n−1) and the results are added:

$$(1 + e + e^2 \ldots + e^{n-2})(L2^2 - L1^2) = Ln^2 - L1^2 \tag{17}$$

From this equation, we get:

$$\frac{1 - e^{n-1}}{1 - e}(L2^2 - L1^2) = Ln^2 - L1^2 \tag{18}$$

The equation (18) is solved for $L2^2$:

$$L2^2 = \frac{1 - e}{1 - e^{n-1}} Ln^2 + \frac{e - e^{n-1}}{1 - e^{n-1}} L1^2 \tag{19}$$

By adding up to m:

$$Lm^2 = \frac{1 - e^{m-1}}{1 - e} Ln^2 + \frac{e - e^{m-1}}{1 - e} L1^2 \tag{20}$$

Therefore, $$Lm = \sqrt{\frac{1 - e^{m-1}}{1 - e^{n-1}} Ln^2 + \frac{e^{m-1} - e^{n-1}}{1 - e^{n-1}} L1^2} \tag{21}$$

Where the correction is to be made in view of the radius of the arcuate light source, Lm can be determined by replacing the correction coefficient e with:

$$e' = e \times \beta^{1/(n-1)}$$

where $\beta$ is the correction coefficient for the arcuate light source.

Therefore, the shape of the reflecting surface should be designed so that the mth light ray will fall on the plane-parallel plate 10A at a position spaced the distance Lm, given by the equation (21), from the axis 18.

If the reflecting surface is a continuous surface, then Lm in the equation (21) is converted to a continuous function L($\theta$) of the angle $\theta$ with n being infinity, and the differential equation (12) should be solved using the continuous function.

Figure 5:
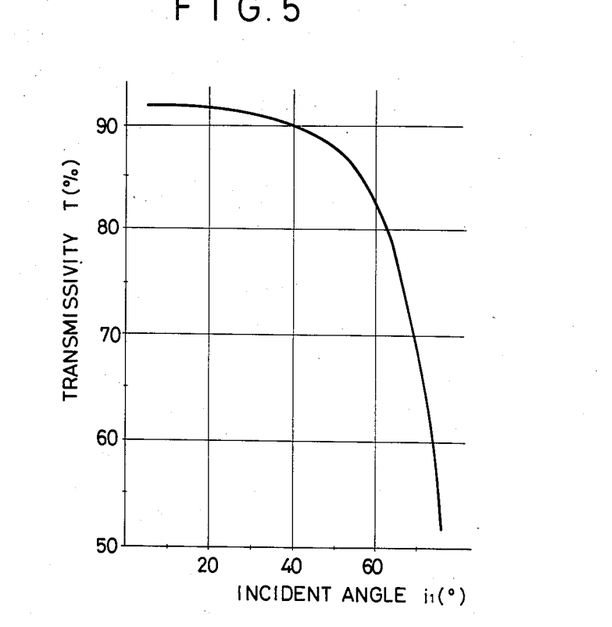
FIG. 5 is a graph showing the relationship between the incident angle and transmittivity of a plate of glass.

FIG. 5 shows the relationship between the incident angle i and the transmittivity T where the transparent plane-parallel plate 10A is a plate of glass and the ratios $\alpha$, $\beta$ of the polarized light components are $\alpha = \beta = 0.5$. FIG. 5 clearly indicates that the transmittivity T sharply drops when the incident angle i exceeds 40 degrees. Where no strict accuracy is required of illumination uniformity, it is sufficient to effect the correction of the shape of the reflecting surface in view of the transmittivity of the plane-parallel plate only for those light rays which fall on the plate at incident angles higher than 40 degrees. In view of the reduction of the amount of light, the incident angle i should preferably be smaller than 70 degrees if the plane-parallel plate is of glass.

Where the illuminating device of FIG. 4 is employed for illuminating an original document in an electrophotographic copying machine, the reflecting mirror 16A should be designed such that the reflecting mirror 16A crosses a regular-reflection limit line from the plane-parallel plate 10A to a lens (not shown), a light ray impinging on the reflecting mirror 16A most closely to the axis 18 illuminates the illuminated zone at a portion thereof closest to the axis 18, the illuminated position on the illuminated zone will be remoter from the axis 18 as the position where the light ray falls on the reflecting mirror 16A is remoter from the axis 18, and the angle of incidence of each light ray onto the plane-parallel plate 10A is larger than the angle of the regular-reflection limit line. With this arrangement, light is prevented from being reflected directly from the plane-parallel plate 10A toward the lens.

In the aforesaid embodiments, the light source is in the form of an arcuate lamp. However, the light source may comprise a point light source. With this alternative, the conditions for designing the shape of the reflecting surface can be determined in the same manner as described above. If the point light source is used, it should be positioned on the axis of revolution of the reflecting surface.

Figure 6:
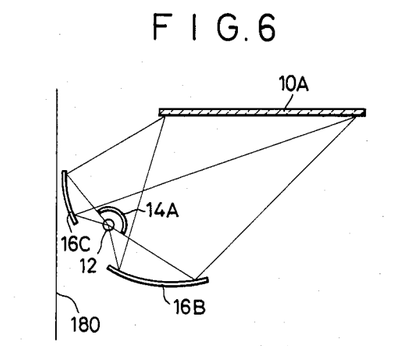
FIG. 6 is a schematic view of a modification of the illuminating device of FIG. 4.
Figure 7:
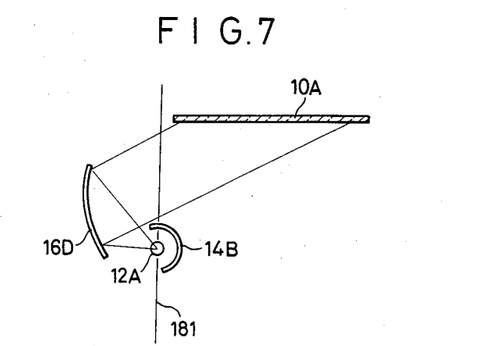
FIG. 7 is a schematic view of another modification of the illuminating device of FIG. 4.

Two modifications of the embodiment shown in FIG. 4 are illustrated in FIGS. 6 and 7, respectively.

Designated in FIG. 6 at 14A is a light-shielding member, and 16B, 16C reflecting mirrors. The reflecting mirrors 16B, 16C have reflecting surfaces defined as curved surfaces of revolution having a common axis 180. Each of the reflecting mirrors 16B, 16C is configured to be able to uniformly illuminate the flat surface of the plane-parallel plate 10A by itself. The light source lamp 12 is arcuate and has a central axis aligned with the axis 180.

Designated in FIG. 7 at 12A is a lamp having a point light source, 14B a light-shielding member cooperating with the lamp 12A in constituting the point light source, and 16D a reflecting mirror having a reflecting surface defined as a curved surface of revolution having an axis 181. The light source is positioned on the axis 181 so that the point light source is located on the axis 131. The reflecting surface of the reflecting mirror 16D is shaped to be able to uniformly illuminate a planar object such as an original document through the plane-parallel plate 10A. Where the point light source is used and the reflecting mirror 16D and the illuminated zone are located on the opposite sides of the axis 181, as shown, the illuminating device can be constructed in a compact design. The modifications of FIGS. 6 and 7 are also appliable to the embodiment of FIGS. 1 through 3.

Figure 8:
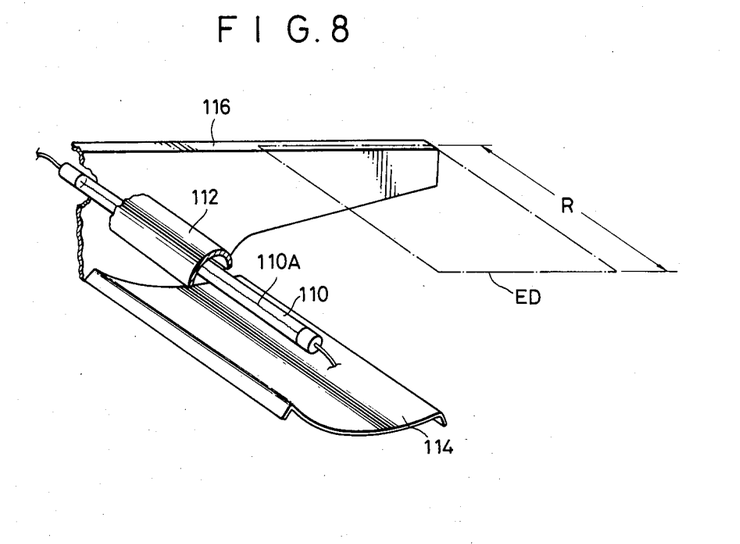
FIG. 8 is a perspective view, partly cut away, of an illuminating device according to another embodiment of the present invention.

FIG. 8 illustrates an illuminating device according to still another embodiment of the present invention. Denoted at ED is an effective illuminated zone. A planar object to be illuminated is placed in the effective illuminated zone ED. The effective illuminated zone ED has a width R.

The illuminating device has an elongate xenon lamp 110 and a light-shielding member 112 which jointly constitute a light source. The xenon lamp 110 has a straight uniform light-emitting portion 110A having a length (through which it can effectively emit light) larger than the width R of the effective illuminated zone ED so that the longitudinal ends of the light-emitting portion 110A are positioned beyond the width R.

A reflecting mirror 114 has a longitudinal axis (along which the curvature of the reflecting surface is nil) extending parallel to the longitudinal direction of the light-emitting portion 110A of the xenon lamp 110. The longitudinal length of the reflecting mirror 114 is larger than the width R so that the longitudinal ends of the reflecting mirror 114 are located beyond the width R.

The light-shilding member 112 serves to shield the effective illuminated zone ED from direct light emitted by the xenon lamp 110.

A pair of side reflecting plates 116 is disposed at the longitudinal ends of the light source and the reflecting mirror 114 for preventing a reduction in the illuminance at the ends of the effective illuminated zone in the direction along the width R. One of the side reflecting plates 116 is omitted from illustration in FIG. 8 for the sake of clarity.

It will easily be understood that no side reflecting plates will be necessary if the length of the light-emitting portion 110A is sufficiently larger than the width R of the effective illuminated zone ED.

The shape of the reflecting surface of the reflecting mirror 114 for uniformly illuminating the effective illuminated zone ED will be described below.

Figure 9:
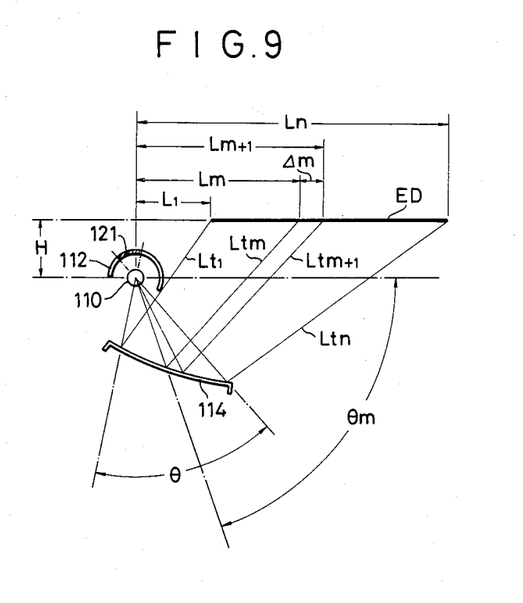
FIG. 9 is a view explanating the shape of the reflecting surface of a reflecting mirror in the illuminating device shown in FIG. 8.

FIG. 9 shows a cross section of the illuminating device of FIG. 8, taken along a plane normal to the light-emitting portion of the lamp 110. Assuming that the length of the light-emitting portion is sufficiently larger than the width R (as achieved by the presence of the pair of side reflecting plates 116), the condition in which the effective illuminated zone ED is illuminated remains the same in the longitudinal direction of the light-emitting portion because of symmetry thereof. Therefore, the illumination of the effective illuminated zone ED may be analyzed two-dimensionally, or in the plane shown in FIG. 9. The plane of FIG. 9 will hereinafter be referred to as a reference plane.

For the sake of brevity, the same symbols (such as $L_m$, $L_n$) employed in the preceding embodiments will be used in the analyzing process for finding the conditions with respect to the shape of the reflecting surface in the embodiments which follow.

As illustrated in FIG. 9, it is assumed that light emitted from the light-emitting portion of the xenon lamp 110 within an angle $\theta$ is radiated onto the effective illuminated zone ED. The light-shielding member 112 is semicylindrical and has its center aligned with the light-emitting portion. An inner surface 121 of the light-shielding member 112 which confronts the reflecting mirror 114 across the light-emitting portion is a reflecting surface for reflecting light back to the light-emitting portion to illuminate the effective illuminated zone ED. Thus, the light-shielding member 112 doubles as an auxiliary reflecting member.

It is assumed that n light rays $Lt_1, Lt_2, \ldots, Lt_m, Lt_{m+1}, \ldots, Lt_n$ are emitted from the light-emitting portion of the xenon lamp 110 in the angle $\theta$ within the reference plane. These light rays are emitted at equal angles so that any adjacent light rays are spaced equal angles.

If the n light rays $Lt_1, Lt_2, \ldots, Lt_m, Lt_{m+1}, \ldots, Lt_n$ fall on the effective illuminated zone ED at equal intervals, then the effective illuminated zone ED is uniformly illuminated. Therefore, the reflecting surface of the reflecting mirror 114 should meet the requirement that the light rays $Lt_m$ ($m=1$ through $n$) emitted at equal angles from the light-emitting portion impinge on the effective illuminated zone ED at equal intervals.

The light-emitting portion is projected perpendicularly onto a plane in which the effective illuminated zone ED lies, and distances $L_1, L_2, \ldots, L_m, L_{m+1}, \ldots, L_n$ are defined from the position (reference position) in which the light-emitting portion is projected onto that plane. The distance $L_m$ is a distance between the reference position and the position in which mith light rays $Lt_d$ out of the n light rays falls on the effective illumiated zone ED. This definition of distance is effective for all m's in 1 through n. The angle formed between a line passing through the light-emitting portion parallel to the effective illuminated zone ED within the reference plane and the mth light ray $Lt_m$ ($m=1$ through n) emitted from the light-emmitting portion is defined as $\theta m$ as shown. It is also assumed that $Lm+1-Lm=\Delta M$ (m is 1 through n−1).

The above condidition of uniform illumination can then be expressed by:

$$\Delta 1 = \Delta 2 = \Delta 3 = \ldots = \Delta m = \ldots = \Delta n - 1 \tag{22}$$

From this, we obtain:

$$\sum_{m=1}^{n-1} \Delta m = Ln - L1 \tag{23}$$

Therefore, $$(n-1)\Delta 1 = Ln - L1 \tag{24}$$

and $$\Delta_1 = \frac{1}{n-1}(Ln - L1) \tag{25}$$

Since $$\sum_{m=1}^{m-1} \Delta m = Lm - L1$$

we get, $$\Delta_1 = \frac{1}{m-1}(Lm - L1) \tag{26}$$

From the equations (25) and (26), $$Lm = \frac{m-1}{n-1} Ln + \frac{n-m}{n-1} L1 \tag{27}$$

Likewise, $\theta m$ can be given by:

$$\theta m = \frac{m-1}{n-1} \theta n + \frac{n-m}{n-1} \theta 1 \tag{28}$$

It is assumed that a polar coordinate system within the reference plane has an origin at the light-emitting portion, and the position on the reflecting mirror 114 which reflects the light ray Ltm is defined by $(\gamma m, \theta m)$ in the polar coordinate system. The inclination $\alpha m$ of the reflecting surface at the position $(\gamma m, \theta m)$ should meet the equation:

$$\alpha m = \frac{\sin \theta m + \frac{H - \gamma m \sin \theta m}{P}}{\cos \theta m + \frac{Lm - \gamma m \cos \theta m}{P}} \tag{29}$$

where $$P = \sqrt{(H - \gamma m \sin \theta m)^2 + (Lm - \gamma m \cos \theta m)^2}$$

(H is the distance between the light-emitting portion and the plane in which the effective illuminated zone ED lies), P being the distance between the reflected point and the illuminated point.

Therefore, the reflecting surface of the reflecting mirror 114 should be designed to meet the equations (27), (28), and (29). If n is infinity, the reflecting surface is a continuous curved surface, and $\alpha m$ is the angle of inclination of the reflecting surface at the reflected point.

If the polar coordiates of the reflecting surface which is a continuous curved surface are given as $(\gamma, \theta)$, then $\gamma, \theta$ are expressed by the following differential equation:

$$\left(\frac{\alpha \gamma}{\alpha \theta}\right)^2 - 2\gamma \times \frac{L\cos\theta + H\sin\theta - \gamma}{H\cos\theta - L\sin\theta} \times \left(\frac{\alpha \gamma}{\alpha \theta}\right) - \gamma^2 = 0 \tag{30}$$

where $L = L(\theta)$ (a continuous function of $\theta$) converted from the equation (27). $\gamma = \gamma(\theta)$ and $L = L(\theta)$ meet $\gamma 1 = \gamma(\theta 1)$, $L1 = L(\theta 1)$, $\gamma n = \gamma(\theta n)$, and $Ln = L(\theta n)$ as boundary conditions.

For example, if the equation (27) is expressed as a fuction of $\theta$, then $$L = \frac{\theta - \theta 1}{\theta n - \theta 1} Ln + \frac{\theta n - \theta}{\theta n - \theta 1} L1 \tag{31}$$

$$= \frac{1}{\theta n - \theta 1} \{\theta(Ln - L1) - \theta 1 Ln + \theta n L1\}$$

By putting the equation (31) into the equation (30) and analytically solving the equation (30) for $\gamma = \gamma(\theta)$, the strict shape of the reflecting surface can be determined.

Where the reflecting mirror 114 is constructed of n successive narrow strip-shaped flat mirrors, a reflecting surface which is virtually free of problems can be obtained by using a computer and having a sufficiently large n. The shape of the reflecting surface can be determined by at least varying $\gamma$ and successively determining reflecting surface coordinates so that the reflecting surfaces of reflected points for adjacent light rays or the tangent lines at the reflected points intersect between the light rays.

The accuracy of the reflecting surface can be lowered and variations in illuminance due to light emission fluctuations can be reduced by increasing the distance traversed by an effective light ray from the light-emitting portion to the reflecting surface by ten times or more variations in the light emission diameter and position of the light-emitting portion.

Figure 10:
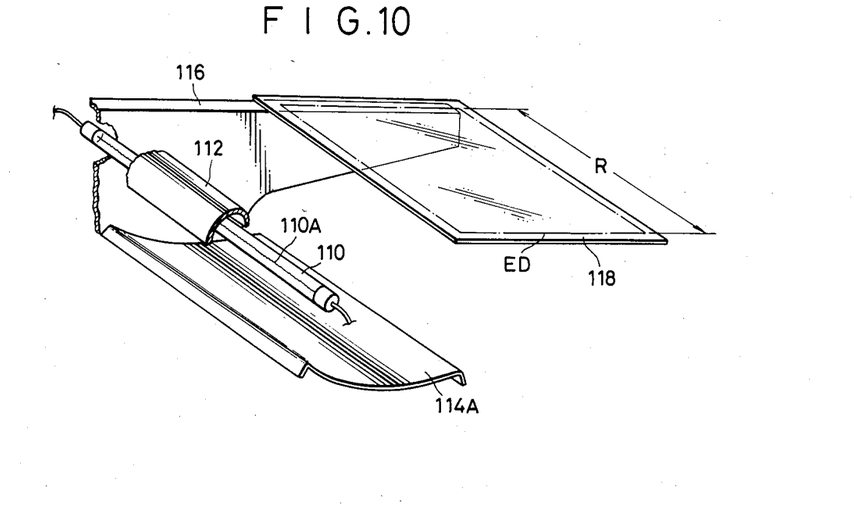
FIG. 10 is a perspective view, partly cut away, of an illuminating device according to still another embodiment of the present invention.
Figure 11:
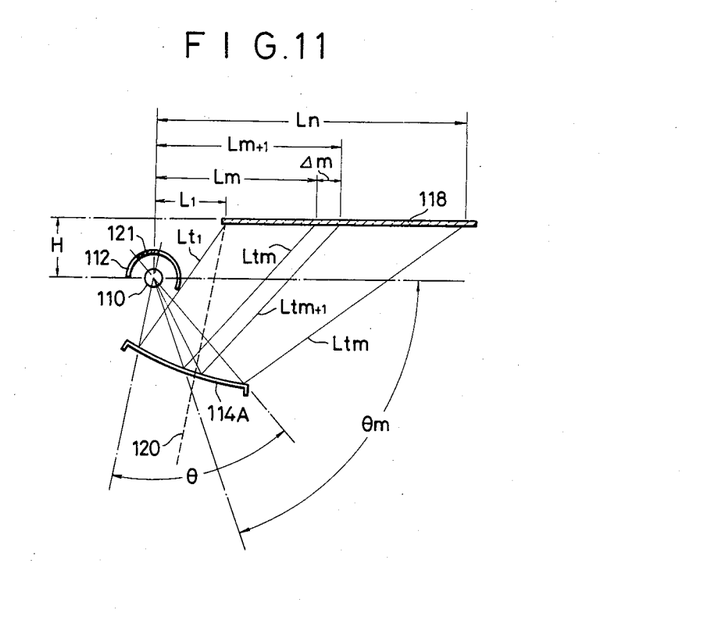
FIG. 11 is a view explanating the shape of the reflecting surface of a reflecting mirror in the illuminating device shown in FIG. 10.

FIGS. 10 and 11 show an illuminating device according to a still further embodiment of the present invention. FIG. 11 shows the illuminating device in the longitudinal direction of the xenon lamp 110.

The conditions for determining the shape of the reflecting surface of the reflecting mirror 114A will be described with reference to FIG. 11.

The object to be illuminated is illuminated with light passing through a plane-parallel plate 118, the transmittivity T thereof being variable dependent on the incident angle i as follows:

$$T = \alpha T s^2 + \beta T p^2 \tag{32}$$

where $Ts = \sin 2i1 \cdot \sin 2i2 / \sin^2(i1 + i2)$ $Tp = \sin 2i1 \cdot \sin 2i2 / \sin^2(i1 + i2) \cos^2(i1 - i2)$ $\sin i1 = \sin i2$ n: refractive index, i2: angle of refraction, Tp, Ts: the transmittivities of polarized light components, and $\alpha, \beta$: the ratios of the polarized light components $(\alpha + \beta = 1)$.

In the event that the light rays Lt1, Lt2, ..., Ltm, ..., Ltn fall on the plane-parallel plate 118 at incident angles $\rho 1, \rho 2, \ldots, \rho m, \ldots, \rho n$, respectively, in the arrangement of FIG. 11, the transmittivities of these light rays are different from each other since $\rho 1 < \rho 2 < \rho 3 \ldots < \rho m < \rho n$. Therefore, the object cannot be illuminated uniformly by making constant the distance $\Delta m$ between adjacent light rays.

It is assumed that the transmittivities of the light rays Lt1, Ltn (incident angles $\rho 1$, $\rho n$) are T1, Tn, respectively, and the ratio (Tn/T1) is variable equally at intervals between positions illuminated by the light rays. Since the number of intervals is $(n-1)$, $$e = \left(\frac{Tn}{T1}\right)^{1/(n-1)} \quad (33)$$

The requirement for uniform illumination thus becomes:

$$\frac{\Delta 2}{\Delta 1} = \frac{\Delta 3}{\Delta 1} = \ldots = \frac{\Delta m}{\Delta m - 1} = \ldots = \frac{\Delta n - 1}{\Delta n - 2} = e \quad (34)$$

Therefore, $$\left.\begin{array}{l} \Delta 2 = e\Delta 1 \\ \Delta 3 = e\Delta 2 = e^2 \Delta 1 \\ \cdot \\ \cdot \\ \cdot \\ \Delta m = e^{m-1}\Delta 1 \\ \Delta n - 1 = e^{n-1}\Delta 1 \end{array}\right\} \quad (35)$$

By adding both sides of the equation (35) and adding $\Delta 1$ to both sides thereof, $$\sum_{m=1}^{n-1} \Delta m = (1 + e + e^2 + e^{n-2})\Delta 1 \quad (36)$$

Since the righthand side of the equation (36) is $Ln - L1$, $$Ln - L1 = \frac{1 - e}{1 - e^{n-1}} \Delta 1 \quad (37)$$

By solving the equation (37) for $\Delta 1$, $$\Delta 1 = \frac{1 - e^{n-1}}{1 - e} (Ln - L1) \quad (38)$$

Likewise, the equation (35) is used to add from $\Delta 1$ up to $\Delta m$:

$$Lm - L1 = \frac{1 - E}{1 - e^{m-1}} \Delta 1 \quad (39)$$

By combining the equation (39) and the equation (37), we obtain:

$$Lm = \frac{1 - e^{m-1}}{1 - e^{n-1}} Ln + \frac{e^{m-1} - e^{n-1}}{1 - e^{n-1}} L1 \quad (40)$$

This equation expresses the condition for determining the shape of the reflecting surface. Therefore, the reflecting surface of the mirror 114A should be designed to meet this condition.

By putting Lm of the equation (19) as a continuous function $L=L(\theta)$ into the equation (30), the strict configuration of the reflecting surface of the reflecting mirror 114A is given as $\gamma = \gamma(\theta)$ which meets the equation (30).

The relationship between the incident angle i and the transmittivity T at the time the plane-parallel plate 118 is a plate of glass and $\alpha = \beta = 0.5$ is illustrated in FIG. 5 as described above. As shown in FIG. 5, the transmittivity T sharply drops when the incident angle i exceeds 40 degrees. Where no strict accuracy is required of illumination uniformity, it is sufficient to effect the correction of the shape of the reflecting surface in view of the transmittivity of the plane-parallel plate only for those light rays which fall on the plate at incident angles higher than 40 degrees. In view of the reduction of the amount of light, the incident angle i should preferably be smaller than 70 degrees if the plane-parallel plate is of glass.

Where the illuminating device of FIG. 11 is employed for illuminating an original document in an electrophotographic copying machine, the reflecting mirror 114A should be designed such that the reflecting mirror 114A crosses a regular-reflection limit line 120 from the plane-parallel plate 118 to a lens (not shown), a light ray emitted from the light source remotely from the illuminated position illuminates the illuminated zone at a portion thereof close to the light source, the illuminated position will be remoter from the light source as the exit light ray comes nearer the illuminated position, and the angle of incidence of each light ray is larger than the angle of the regular-reflection limit line (as shown in FIG. 11). With this arrangement, flare light is prevented from being reflected from the plane-parallel plate 118 toward the lens.

Figure 12:
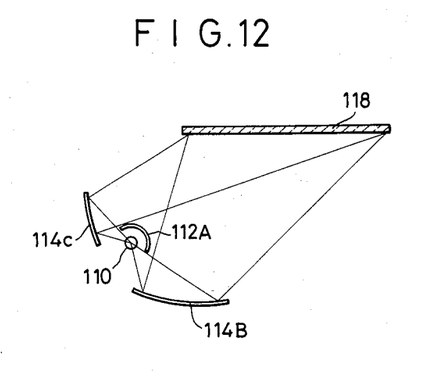
FIG. 12 is a schematic view of a modification of the illuminating device of FIG. 10.

FIG. 12 shows a modification of the embodiment shown in FIGS. 10 and 11. The light source composed of the lamp 110 and the light-shielding member 112A is shared by reflecting mirrors 114B, 114C. Each of the reflecting mirrors 114B, 114C, if used independently, has a reflecting surface shaped to uniformly illuminate an effective illuminated zone through the plane-parallel plate 118. The illumination efficiency can be increased by thus using a plurality of reflecting mirrors to increase the reflected luminous flux. Where the length of the light source is not sufficiently large as compared with the width of the effective illuminated zone, side reflecting plates may be used in combination with the reflecting mirrors. The modification of FIG. 12 is also applicable to the embodiment of FIGS. 8 and 9.

Figure 13:
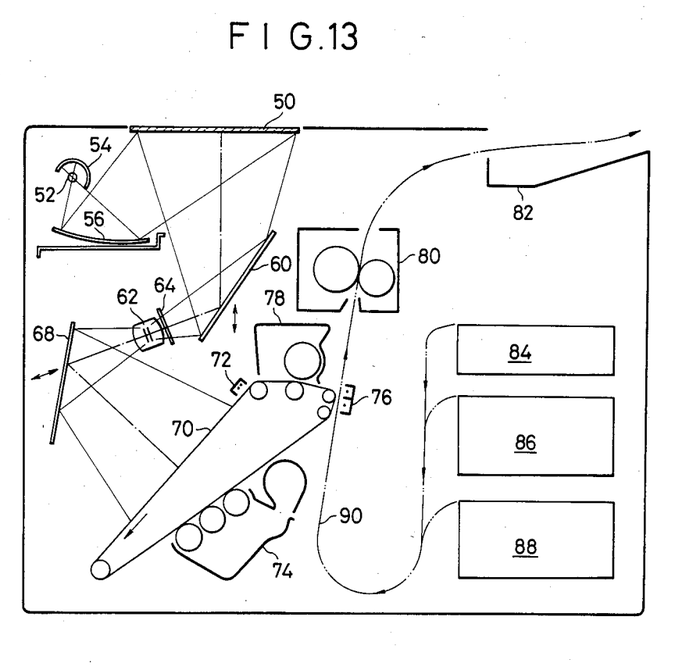
FIG. 13 is a schematic front elevational view of an electrophotographic copying machine employing the illuminating device of the present invention.

FIG. 13 schematically shows an electrophotographic copying machine incorporating the illuminating device of the present invention. The copying machine has an original document support 50 made of glass. An original document to be copied is placed on the glass support 50 and illuminated through the glass support 50.

Therefore, only the embodiments shown in FIGS. 4 and 10, 11 can be incorporated in the copying machine of FIG. 13.

The illuminating device is composed of a lamp 52, a light-shielding member 54, and a reflecting mirror 56 which are arrange as shown in FIG. 4 or FIGS. 10 and 11.

When the original document on the glass support 50 is illuminated by the illuminating device, the surface of the original document is uniformly illuminated, and light reflected by the original document is transmitted via a filter 64, a lens 62, and a reflecting mirror 68 and focused on a belt-shaped photosensitive body 70. Prior to exposure, the photosensitive body 70 is uniformly charged by a charger 72. During exposure, the photosensitive body 70 is held at rest. The filter 64 serves to uniformly correct the intensity of light to which the photosensitive body 70 is exposed, in view of the cosine law of the lens 62.

Upon movement of the photosensitive body 70, an electrostatic latent image formed on the photosensitive body 70 upon exposure is moved through a development device 74 in which the electrostatic latent image is developed into a visible image.

A stack of image transfer sheets is stored in each of sheet cassettes 84, 86, 88. An image transfer sheet is delivered from a selected one of the sheet cassettes along a feed path 90 to an image transfer unit 76, by which the visible image is transferred to the image trnasfer sheet. The visible image is then fixed to the sheet by a fixing device 80. The sheet carrying the fixed visible image is thereafter discharged onto a tray 82. After the visible image has been transferred, any residual toner is removed from the photosensitive body 70 by a cleaner 78. One copying process is now completed.

In the illustrated copying machine, the reflecting mirrors 60, 68, the lens 62, and the filter 64 are movable in the directions of the arrows for changing copying magnifications. Since the original document is uniformly illuminated, uniform exposure conditions can be achieved even when a different copying magnification is used.

Figure 14:
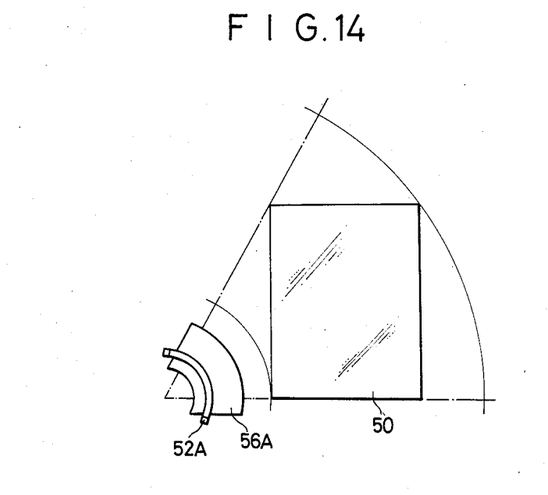
FIGS. 14 and 15 are schematic views illustrative of a preferred arrangement of the illuminating device of the invention incorporated in the electrophotographic copying machine.

During operation of the copying machine, light emitted to illuminate the original document often dazzles the operator. To prevent such a problem, as shown in FIG. 14, an illuminating device composed of a lamp 52A and a reflecting mirror 56A (arranged according to the embodiment of FIG. 4) may be displaced with respect to the glass support 50 more closely to the operator (downwardly in FIG. 14). Alternatively, as illustrated in FIG. 15, an illuminating device composed of a lamp 110, a reflecting mirror 114D, and side reflecting plates 116A may be disposed more closely to the operator and downwardly of the glass support 118A.

Figure 15:
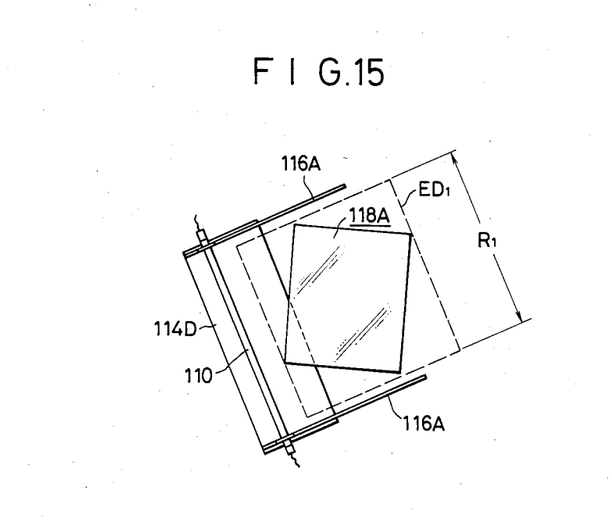

The light-shielding member in the illuminating device is omitted from illustration in FIGS. 14 and 15. In FIG. 15, an area EDI indicated by the broken line is an effective illuminated zone having a width RI. The operator is positioned in a lower portion of FIGS. 14 and 15. As shown in FIGS. 14 and 15, the illuminating device is tilted in the direction of the depth of the copying machine (in the vertical direction in FIGS. 14 and 15) to direct illuminating light obliquely in rightward and upward directions in FIGS. 14 and 15 for thereby preventing the light from dazzling the operator.

The illuminating device of the present invention, constructed as described above, can uniformly illuminate a planar object.

The auxiliary reflecting member may be integral with or separate from the light-shileding member. The lamp is not limited to the xenon lamp, but may be other lamps.

Although certain preferred embodiments havebeen shown and described, it should be understood that many changes and modifications may be made therein without departing from the scope of the appended claims.

What is claimed is:

1. An illuminating device for uniformly illuminating a planar object through a transparent plane-parallel plate, comprising a reflecting mirror having a reflecting surface defined as a curved surface of revolution and a light source, said reflecting surface having an axis of revolution extending perpendicularly to a plane to be illuminated and disposed outside of an illuminated zone, said reflecting surface being shaped so as to reflect light from said light source toward said plane to be illuminated at a luminous flux density proportional to the distance from said axis and correcting for variations in the transmissivity of said transparent plane-parallel plate.

2. An illuminating device according to claim 1, wherein said light source comprises a point light source positioned on said axis.

3. An illuminating device according to claim 1, wherein said light source comprises an arcuate light source having a central axis aligned with said axis.

4. An illuminating device according to claim 3, wherein said reflecting surface is shaped to correct the proportionality of said luminous flux density with said distance dependent on the radius of said arcuate light source.

5. An illuminating device according to claim 1, 2, 3 or 4, wherein said light source has a light-emitting portion and an auxiliary reflecting member for re-flecting emitted light back to said light-emitting portion, said auxiliary reflecting member being positioned in confronting relation to said reflecting mirror across said light-emitting portion.

6. An illuminating device according to claim 5, including a side reflecting plate extending radially outwardly from said axis.

7. An illuminating device according to claim 6 wherein said transparent plane-parallel plate comprises a plate of glass, said reflecting surface being shaped to provide correction for light rays falling on said plate of glass at incident angles of 40 degrees or more.

* * * * *